Dec. 1, 1959
W. S. PAJES
2,915,581
METHOD AND APPARATUS FOR IMPRESSING
SUB-TITLES ON MOTION PICTURE FILM
Filed Dec. 15, 1954
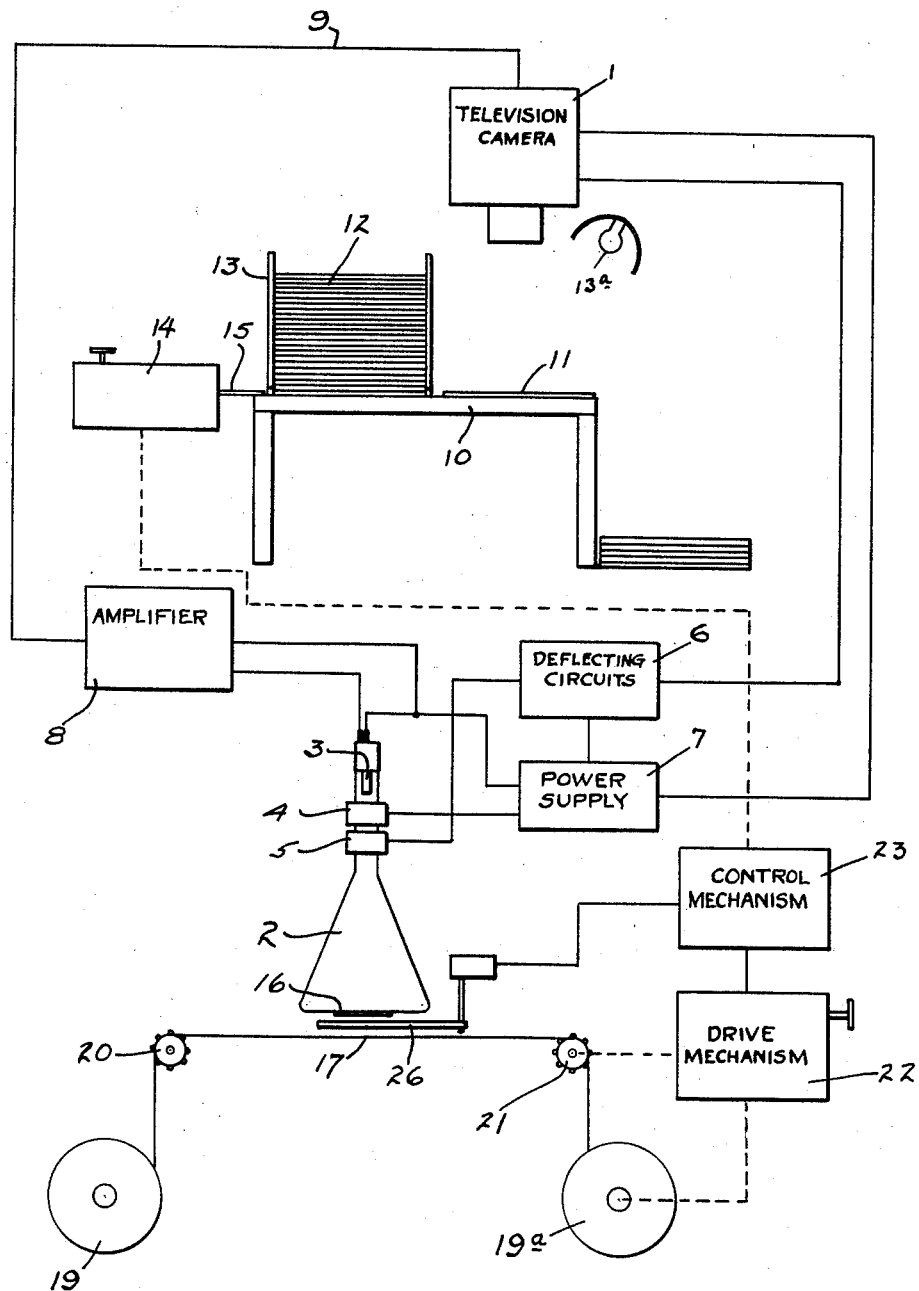
INVENTOR
WOLF SZMUL PAJES
BY Robert Harding Jr.
ATTORNEY

United States Patent Office 2,915,581
Patented Dec. 1, 1959

2,915,581

METHOD AND APPARATUS FOR IMPRESSING SUB-TITLES ON MOTION PICTURE FILM

Wolf Szmul Pajes, New York, N.Y.

Application December 15, 1954, Serial No. 475,445

4 Claims. (Cl. 178—6.7)

This invention relates to a method and an apparatus for impressing indicia on transparencies upon which images have been photographically reproduced. The invention is especially concerned with impressing explanatory subtitles on motion picture film.

There are two well known methods of impressing explanatory subtitles on photographic film, particularly motion picture film. The first method consists in making a separate film containing only the explanatory subtitles and rephotographing the film containing the picture and that containing the subtitles in superposed relation on a single film.

The second method consists in coating the emulsion of the moving picture film with a protective coating, such as paraffin, impressing photoengraved dies containing the subtitles onto the coating, thus displacing the coating and exposing the emulsion, and then removing the emulsion by allowing an etching agent, such as sodium hypochlorite, to act upon the exposed parts of the emulsion.

There are several varieties of the methods described above, but all of them involve numerous mechanical and chemical processes which are relatively costly and time consuming.

An object of the present invention is to avoid these complicated operations and to provide an electronic method and apparatus for impressing characters and particularly subtitles on motion picture film.

The invention is based on the use of a cathode ray tube provided with a Lenard window with the electron beam focused on a plane outside the window. The beam passes through the window and is caused to scan an area on the film which is placed at the focal plane of the beam. The action of the beam is purely thermal and removes the emulsion by melting and burning it away. When the beam is properly modulated by a signal from a television camera focused on a subtitle, the subtitle will be burned into the emulsion, leaving the clear base of the film at the places where the letters appear. When projected on a screen, the subtitles will appear white.

The invention is illustrated in the accompanying drawing in which the single figure is a schematic representation of one form of apparatus for carrying out the invention.

Referring now more specifically to the drawing, the invention comprises a television camera 1 and a cathode ray tube 2. The cathode ray tube 2 is provided with the usual electron gun 3, beam focusing device 4, and beam deflecting device 5 which may operate electromagnetically or electrostatically. A deflecting circuit 6 is connected to the beam deflecting device for controlling the scanning movement of the beam and may also be connected to the television camera, so that the scanning of the image field by the camera will be in synchronism with the movement of the cathode ray beam in the cathode ray tube 2. A suitable power supply 7 is connected to the electrical circuits of the camera 1 and cathode ray tube 2 for supplying the required voltages and power for operating these devices.

The output of the television camera is fed through an amplifier 8 and over a suitable cable 9 to the cathode ray tube 2 where it may be applied to the control grid of the tube.

A platform 10 is mounted directly beneath the camera 1 in such a position that the camera will be focused upon a card 11 lying upon the surface of the platform. The card 11 is one of a stack 12 of such cards having different subtitles printed or drawn upon them and held in a holder 13 arranged at one side of the platform 10. Suitable feeding mechanism 14 is provided adjacent the stack of cards and is adapted to feed the cards one at a time onto the platform 10 by means of a pusher arm 15. The operation of this feeding mechanism 14 may be controlled in a manner to be described.

The cathode ray tube is provided at its enlarged end with a Lenard window 16 through which the beam of electrons passes, and the focusing device 4 is arranged to focus the beam on a plane, indicated at 17, outside the tube. The motion picture film 18, upon which the subtitles are to be impressed, is unwound from a reel 19 and wound upon a reel 19a, suitable guide sprockets 20 and 21 being positioned so that the film will lie in the plane 17 beneath the Lenard window.

The movement of the film beneath the Lenard window may be controlled by the sprocket 21 which is driven by a mechanism 22 in such a manner as to move the film intermittently, each frame on the film remaining stationary for a predetermined time beneath the Lenard window.

Since it may be desired to apply one subtitle to a greater number of frames on the film than another, and since between every two subtitles there may be a number of frames on which it is unnecessary to apply any subtitles, the feeding mechanism 14 can not be directly driven from the film mechanism 22. A control mechanism 23 may be provided operatively connected between the film moving mechanism 22 and the cards feeding mechanism 14 so as to cause the proper number of frames to pass under the Lenard window for each particular subtitle card and so as to cause the proper number of frames to pass between subtitles.

The control mechanism may be operated by a programming tape, as used in the computer art, which tape may be previously prepared for the particular film. Or, of course both the drive mechanism 22 and the feed mechanism 14 may be operated by hand using, respectively, the knobs 24 and 25.

In order to prevent any effect on the film from the tube while the film is moving or during the time when the frames are not to have subtitles impressed thereon, a shutter 26 may be provided in operative connection with the control mechanism 23 and mounted so it can be moved into and out of a position between the Lenard window and the film.

In operating the apparatus, a stack of cards 11 having the subtitles printed thereon and arranged in the proper order is placed in the holder 13. The film to be subtitled is placed on the reel 19 and fed over the sprockets 20 and 21 and attached to the center of the reel 19a. The power for the camera and tube is then turned on as well as the control mechanism. The pusher arm 15 attached to the feeding mechanism 14 will now push a card onto the table below the Lenard window of the tube 2, and at the same time the shutter is moved away from under the window. The card on the table will be illuminated by light directed upon it by the light source 13a. The camera will now scan the subtitle printed upon the card and will produce a signal which is transmitted to the amplifier 8 and thence to the control grid 3 of the cathode ray tube 2. In the meantime the cathode ray beam has been moving in step with the scanning device of the camera, and the focused electron pencil will pass through the Lenard window and impinge on the film. Since the beam is being modulated in accordance with the signal from the camera, the subtitle printed on the card will be retraced on the film.

When a predetermined number of tracings have been made on the particular frame to remove the emulsion, the control mechanism 23 will cause the shutter 26 to move over the film so as to block the electron beam and the sprocket 21 will be rotated so as to advance the film one frame. The mechanism 23 then removes the shutter 26 and the process is repeated on the second frame with the same card 11 remaining on the table 10. When a predetermined number of frames for a particular subtitle has been treated, the control mechanism 23 again moves the shuttle 26 under the Lenard window and the film is advanced as before, but this time the feeding mechanism 14 is operated to cause the pusher arm 15 to move the next successive card out onto the table 10 and under the light 13a, the first card being pushed off the table where it will fall in position to have the other cards fall successively on top of it. If a number of frames are to be skipped before the next subtitle is to be impressed on the film, the shutter will remain in position under the Lenard window and the sprocket 21 will continue to feed the film intermittently. When the frame is finally reached upon which the next subtitle is to be impressed, the shutter is removed from its blocking position and the scanning process continues as before.

The above process is continued until all the subtitles have been applied to the film. At this time the cards will be stacked in the original order for subsequent use on another copy of the film.

It should be noted that the purpose of the Lenard window in the cathode ray tube 2 is to permit the electron beam to emerge from the tube so that it can be focused on the film. The small stopping power of the mica or aluminum foil which forms the window accomplishes just that. In a time, say of five seconds, with a scanning rate of twenty-four complete scannings a second, the subtitle is traced upon the film five times twenty-four or one hundred and twenty times. Since the emulsion is facing the electron beam, the heat generated by the impact of the electrons will melt and oxidize the emulsion away. For example, if an accelerating voltage of $10^4$ volts is used and the electron beam current is 100 microamperes or $10^{-4}$ amperes, the power concentrated at the focal point will be 1 watt, neglecting losses at the Lenard window. This should be sufficient to remove the emulsion, but it should be understood that the beam intensity and voltage should be adjusted so that just enough heat is generated for removing the emulsion and not enough to affect the plastic base of the film.

Various modifications may be made in the invention and I do wish to limit myself to what has been shown and described except by the limitations contained in the appended claims.

What I desire to claim and secure by Letters Patent is:

1. The method of applying indicia on photographic transparencies which comprises producing a sharply defined beam of electrons, focusing said beam on the emulsion side of said transparency, adjusting the intensity of the beam so as to melt and burn the emulsion away where the beam strikes said transparency, causing said beam to scan the surface of said transparency in a predetermined manner, and reducing the intensity of said beam at predetermined positions of said beam as it sweeps across said surface so as to trace the indicia on said surface.

2. The method of impressing indicia on transparencies, as defined in claim 1, in which the step of reducing the intensity of the electron beam at predetermined positions of said beam comprises printing said indicia on a supporting surface, televising said surface at a scanning sequence and rate synchronized with the scanning sequence and rate of the electron beam, and utilizing the thus produced television signal to modulate the intensity of said electron beam.

3. The method of impressing indicia on transparencies, as defined in claim 2, further comprising the steps of printing a plurality of indicia on a plurality of cards, successively televising said cards, each card being televised for a predetermined time, and moving the transparency step-by-step with respect to the electron beam between successive televisings of said cards.

4. The method of impressing subtitles on motion picture film which comprises providing a plurality of cards each carrying a different subtitle, scanning said cards successively with a television camera so as to produce successive television signal trains of the subtitles of said cards, producing a beam of electrons, focusing said beam upon one frame of said motion picture film on the emulsion side thereof, said beam having sufficient intensity to melt and burn away the emulsion, causing said beam to scan the surface of said film at the same sequence and rate as the cards are scanned by said television camera, varying the intensity of said beam with said television signal, and causing said film to move intermittently so as to permit said beam to traverse each frame of a predetermined successive number of frames a predetermined number of times while a particular card is being scanned by said television camera.

References Cited in the file of this patent

UNITED STATES PATENTS

| | | |
|---|---|---|
| 2,267,714 | Borries | Dec. 30, 1941 |
| 2,351,889 | Strubig | June 20, 1944 |
| 2,666,807 | Hunt | Jan. 19, 1954 |

FOREIGN PATENTS

| | | |
|---|---|---|
| 798,329 | France | May 14, 1936 |